(12) United States Patent
Nishimura et al.

(10) Patent No.: US 6,436,224 B1
(45) Date of Patent: Aug. 20, 2002

(54) METHOD FOR JOINING POLYOLEFIN PIPES AND TREATMENT FOR THE JOINING

(75) Inventors: Hiroyuki Nishimura, Kitakatsuragi-gun; Yuji Higuchi, Kashihara; Shinichi Kawasaki, Kyotanabe; Hiroyuki Maeba, Sakai; Hirofumi Ueda, Takarazuka; Shiro Sakai, Izumiotsu; Hiroaki Zaima, Kyoto, all of (JP)

(73) Assignee: Osaka Gas Company Limited, Osaka (JP)

( * ) Notice: Subject to any disclaimer, the term of this patent is extended or adjusted under 35 U.S.C. 154(b) by 0 days.

(21) Appl. No.: 09/402,993

(22) PCT Filed: Apr. 13, 1998

(86) PCT No.: PCT/JP98/01689

§ 371 (c)(1),
(2), (4) Date: Oct. 13, 1999

(87) PCT Pub. No.: WO98/46928

PCT Pub. Date: Oct. 22, 1998

(30) Foreign Application Priority Data

Apr. 14, 1997 (JP) ............................................. 9-095719

(51) Int. Cl.[7] ............................................. C09J 101/00
(52) U.S. Cl. .................... 156/326; 106/287.1; 156/329
(58) Field of Search ................ 156/326, 329; 106/287.1

(56) References Cited

U.S. PATENT DOCUMENTS

| | | | | | |
|---|---|---|---|---|---|
| 4,718,944 A | * | 1/1988 | Plueddemann | ........... | 106/287.1 |
| 4,726,869 A | * | 2/1988 | Matsui et al. | ............... | 156/329 |
| 4,746,366 A | * | 5/1988 | Philipp et al. | ......... | 106/287.19 |
| 5,167,706 A | * | 12/1992 | Kustaj | ................... | 106/287.11 |
| 5,269,844 A | * | 12/1993 | Yamamoto et al. | ...... | 106/287.1 |

FOREIGN PATENT DOCUMENTS

| | | |
|---|---|---|
| EP | 0269454 | 6/1988 |
| EP | 0537784 | 4/1993 |
| GB | 2277933 | 11/1994 |
| GB | 2277934 | 11/1994 |
| JP | 6145070 | 3/1986 |
| JP | 61257992 | 11/1986 |
| JP | 1118587 | 5/1989 |
| JP | 1203486 | 8/1989 |
| JP | 2186193 | 7/1990 |
| JP | 3292381 | 12/1991 |
| JP | 4334551 | 11/1992 |
| JP | 586349 | 4/1993 |
| JP | 5125351 | 5/1993 |
| JP | 6234165 | 8/1994 |
| JP | 853660 | 2/1996 |
| JP | 9287688 | 11/1997 |

OTHER PUBLICATIONS

"Kipping method" J. Am. Chem. So., 110, 2342–44 (1988).
Macromolecules, 23, 3423 (1990).
J. Chem. So., Chem. Commun., 1161 (1990).
J. Chem. Soc., Chem. Commun., 896 (1992).
Macromolecules, 23, 4494 (1990).

* cited by examiner

Primary Examiner—John J. Gallagher
(74) Attorney, Agent, or Firm—Baker Botts L.L.P.

(57) ABSTRACT

The present invention provides a technique for joining polyolefin pipes by means of a polyolefin joint, the method comprising the steps of placing a treatment containing a silicon compound or a treatment containing a silicon compound and a reaction accelerator between the pipes and the joint and heating a joining portion.

2 Claims, 2 Drawing Sheets

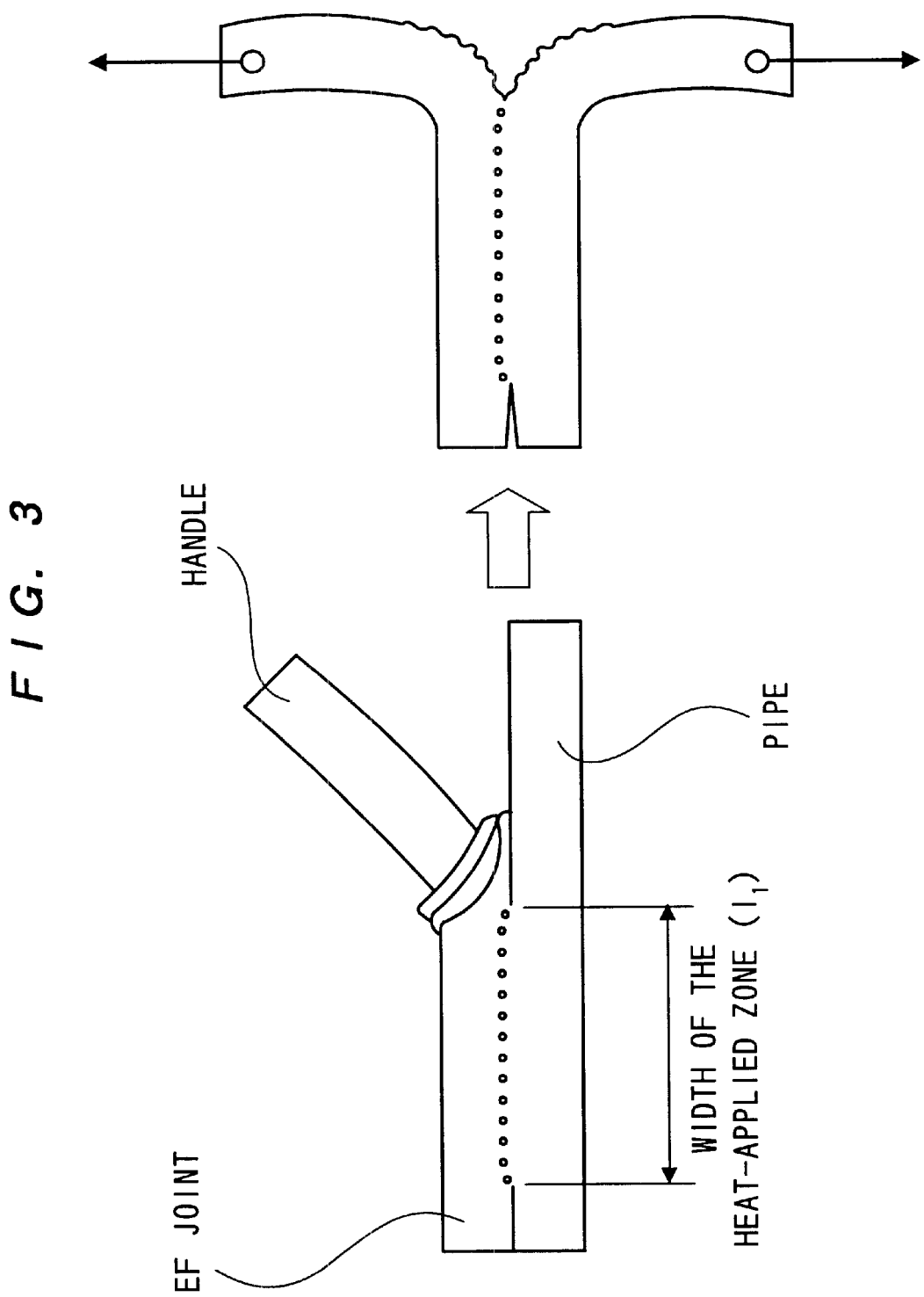

METHOD FOR JOINING POLYOLEFIN PIPES AND TREATMENT FOR THE JOINING

CROSS-REFERENCE TO RELATED APPLICATIONS

This is a national stage application of International Application PCT/JP98/01689 filed on Apr. 13, 1998, which published in Japanese on Oct. 22, 1989, which in turn claims priority from Japanese Patent Application No. 09/95719 filed on Apr. 14, 1997.

TECHNICAL FIELD

The present invention relates to a method for joining polyolefin pipes and a treatment for joining polyolefin.

BACKGROUND ART

Heretofore, electrofusion method (EF method) have been employed for joining polyolefin pipes (the pipes made of polyethylene, polypropylene, polybutene, polymethylpentene and the like) for conducting gas, waterworks, hot-water heating system, etc. In this method, the polyolefin electrofusion joint (EF joint) 3 wherein a spiral electric heating wire 1 is embedded near its inner surface when produced, as shown in FIGS. 1 and 2, and two polyolefin pipes 5 and 7 to be connected are set together, and then a specific amount of electrical energy is supplied from a controller (not shown) to the electric heating wire 1 to generate heat, whereby the inner surface of the EF joint 3 and the outer surfaces of the polyolefin pipes 5 and 7 are fused and welded.

The EF method is rapidly spreading because of the following advantages: 1) it is readily operable that the pipes can be joined and repaired with ease after being cut; 2) the operation can be automated to give stable installation quality in the field; 3) tools for this method are available and can be maintained at a low cost; 4) EF joint, although being relatively expensive, can reduce the total cost of installation, etc.

Prior to joining polyolefin pipes by the EF method, the surfaces of the pipes are preliminary planed (scraped) and wiped with an organic solvent such as acetone and alcohols to form a good fusion-jointed portion. By these pretreatments, oxides (usually about 20 μm) and deposits (sand, muddy water, machine oil, grease, minute polyolefin particles produced by planing) on the surfaces of the polyolefin pipes is removed. As a result, the joint between the EF joint and the pipes is given a favorable condition.

However, joining polyolefin pipes by the EF method is often carried out in the field wherein favorable operating conditions are unlikely. Thus, the situations which impair the favorable fusion-joining are likely to occur after the completion of the above-mentioned pretreatments. A typical example of such situations is a sand particle deposited on the surfaces of the polyolefin pipes or the EF joint. This sand deposit is often invisible to the naked eye, and therefore may remain deposited when the EF joint and polyolefin pipes are jointed by the EF method. It is confirmed that the joining carried out in such situation has little problem under normal conditions. However, when an extraordinary force as by an earthquake is applied to the joining portion, a crack may occur at an incompletely fused portion of the joint portion, leading to hazards such as gas leakage.

BRIEF DESCRIPTION OF DRAWINGS

FIG. 3 is a side view showing the outline of the method for preparing test pieces and the method of peel test in Examples of the present invention.

DISCLOSURE OF THE INVENTION

Figure 1:
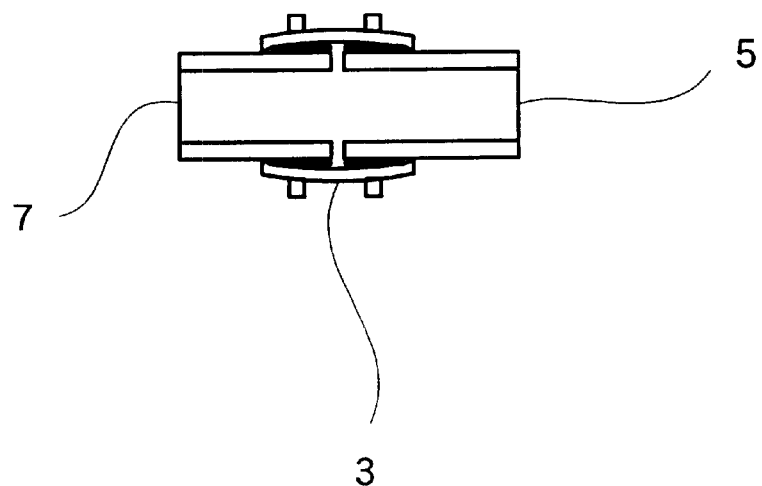
FIGS. 1 and 2 are a cross-sectional view showing the outline of the method for joining two polyolefin pipes using an EF joint.
Figure 2:
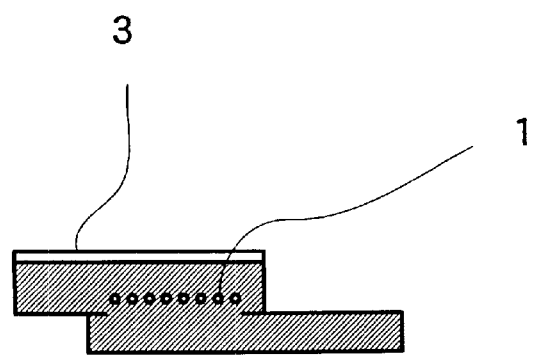

Therefore, it is a primary object of the present invention to provide a joining technique for constantly giving a good joining portion between polyolefin pipes which are joined in the installation field.

In view of the aforementioned problems of the prior art, the inventors of the present invention carried out extensive research. As a result, they found that the EF joint and polyolefin pipes can be excellently fusion-joined by applying a treatment containing a silicon compound or a treatment containing a silicon compound and a reaction accelerator between an EF joint and polyolefin pipes and heating the joining portion. The inventors also found that even when sand particles are deposited on the surfaces of the polyolefin pipes or the EF joint, the joining strength between the pipes and joint is not substantially affected.

More specifically, the present invention provides a method for joining polyolefin pipes as described below and a treatment for joining polyolefin used in the method:

1. A method for joining polyolefin pipes by means of a polyolefin joint, the method comprising the steps of placing a treatment which comprises a solvent containing a silicon compound or a treatment which comprises a solvent containing a silicon compound and a reaction accelerator between the pipes and the joint and heating a joining portion.

2. A treatment for joining polyolefin, wherein the treatment comprises a solvent containing a silicon compound or a solvent containing a silicon compound and a reaction accelerator.

The polyolefin joint for use in the present invention is not limited to an EF joint, but may be a HF joint which uses an external heat source (heater).

In addition, the polyolefin pipes for use in the present invention may be those known in the art.

In the present invention, the silicon compound which is contained in a treatment applied between the polyolefin pipes and polyolefin joint is the compound having Si-Si bond, Si-H bond, Si-O bond or Si-X (X is at least one of a hydroxyl group, alkoxyl group, halogen atom, amino group and amide group) and Si-R (R is at least one of alkyl group, alkenyl group, aryl group and like hydrocarbon groups) within its molecule.

Examples of such silicon compounds are mentioned below:

1. Polysilane: Polysilane is a compound which has at least one Si-Si bond in the main skeleton of its chemical structure, and the groups generally represented by $R^1$–$R^3$ which are attached to Si. Examples of this polysilane are represented by the following formulas (1)–(3): Linear polysilane or cyclic polysilane represented by the formula (1)

wherein $R^1$ and $R^2$ are the same or different and each is selected from the group consisting of a hydrogen atom, halogen atom, hydroxyl group, $C_1$–$C_{20}$ alkyl group, alkenyl group, aryl group, alkoxyl group, amino group, amide group and silyl group; m is usually about 2–10000, preferably about 2–100, more preferably about 2–10; Silicon network polymer represented by the formula (2)

(2)

wherein $R^3$ is selected from the group consisting of a hydrogen atom, halogen atom, hydroxyl group, $C_1$–$C_{20}$ alkyl group, alkenyl group, aryl group, alkoxyl group, amino group, amide group and silyl group; n is usually about 4–10000, preferably about 2–100, more preferably about 2–10; and Network-like polymer represented by the formula (3) having Si-Si bond as a skeleton

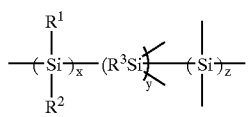
(3)

wherein $R^1$–$R^3$ are the same or at least two of them are different and each is selected from the group consisting of a hydrogen atom, halogen atom, hydroxyl group, $C_1$–$C_{20}$ alkyl group, alkenyl group, aryl group, alkoxyl group, amino group, amide group and silyl group; the total number of x, y and z is usually about 5–10000, preferably about 5–100, more preferably about 5–10.

Such polysilane compounds can be prepared from monomers having the respective structural unit by conventional methods such as A) dehalogenation condensation polymerization of halosilanes in the presence of an alkali metal ("Kipping method" J. Am. Chem. Soc., 110, 2343–44 (1988), Macromolecules, 23, 3423 (1991)), B) dehalogenation condensation polymerization of halosilanes by electrode reduction (J. Chem. Soc., Chem. Commun., 1161 (1990), J. Chem. Soc., Chem. Commun., 896 (1990)), C) dehydrogenation condensation of hydrosilanes in the presence of a metal catalyst (Japanese Unexamined Patent Publication No. 334551/1992), anionic polymerization of disilene crosslinked with biphenyl and the like (Macromolecules, 23, 4494 (1990)), ring-opening polymerization of cyclic disilanes, etc.

Preferred polysilane is a linear polysilane and a cyclic polysilane represented by the formula (1). 2. Polysiloxane: Polysiloxane is a compound which has at least one Si-O-Si bond in the main skeleton of its chemical structure and a group generally represented by R (R is an alkyl group, alkenyl group, aryl group or like hydrocarbon groups) attached to Si. Examples of such polysiloxane include the followings:

Linear polysiloxane or cyclic polysiloxane represented by the formula (4)

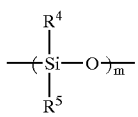
(4)

wherein $R^4$ and $R^5$ are the same or different and are selected from the group consisting of a hydrogen atom, halogen atom, hydroxyl group, $C_1$–$C_{20}$ alkyl group, alkenyl group, aryl group, alkoxyl group, amino group, amide group and silyl group, at least one of which is a hydrogen atom, halogen atom, hydroxyl group, alkoxyl group, alkenyl group, amino group or amide group; m is about 2–10000, preferably about 2–100, more preferably about 2–10;

Network polymer represented by the formula (5)

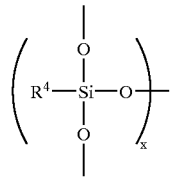
(5)

wherein $R^4$ is selected from the group consisting of a hydrogen atom, halogen atom, hydroxyl group, $C_1$–$C_{20}$ alkyl group, alkenyl group, aryl group, alkoxyl group, amino group, amide group and silyl group, at least one of which is a hydrogen atom, halogen atom, hydroxyl group, alkoxyl group, alkenyl group, amino group or amide group; X is about 4–10000, preferably about 4–100, more preferably about 4–10;

Network-like polymer having Si-O-Si bond as a skeleton represented by the formula (6)

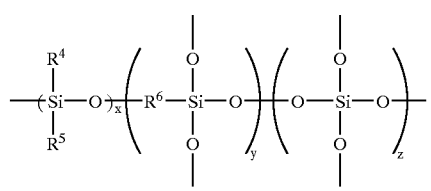
(6)

wherein $R^4$–$R^6$ are selected from the group consisting of a hydrogen atom, halogen atom, hydroxyl group, $C_1$–$C_{20}$ alkyl group, alkenyl group, aryl group, alkoxyl group, amino group, amide group and silyl group, at least one of which is a hydrogen atom, halogen atom, hydroxyl group, alkoxyl group, alkenyl group, amino group or amide group; the total number of x, y and z is usually about 5–10000, preferably about 5–100, more preferably about 5–10;

3. Silicon compound represented by the formula (7)

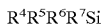
(7)

wherein $R^4$–$R^7$ are selected from the group consisting of a hydrogen atom, halogen atom, hydroxyl group, $C_1$–$C_{20}$ alkyl group, alkenyl group, aryl group, alkoxyl group, amino group and amide group, wherein at least one of a hydrogen atom, $C_1$–$C_{20}$ alkyl group, alkenyl group and aryl group and at least one of hydrogen atom, halogen atom, hydroxyl group, alkoxyl group, amino group and amide group are contained.

Examples of the silicon compounds represented by the formula (7) include vinyltrichlorosilane, vinyltris(βmethoxyethoxy)silane, vinyltriethoxysilane, vinyltrimethoxysilane, γ-(methacryloyloxypropyl)trimethoxysilane, β-(3,4-epoxycyclohexyl)ethyltrimethoxysilane, γ-glycidyl-oxypropyltrimethoxysilane, γ-glycidoxypropylmethyldiethoxysilane, N-β(aminoethyl)γ-aminopropyltrimethoxysilane, N-β(aminoethyl)γ-aminopropylmethyldiethoxysilane, γ-amino-propyltriethoxysilane, N-phenyl-γ-aminopropyltrimethoxysilane, γ-mercaptopropyltrimethoxysilane, γ-chloropropyltrimethoxysilane, vinyltrichlorosilane, vinyltrimethoxysilane, vinyltriethoxysilane, tris-(2-methoxyethoxy)vinylsilane, γ-glycidoxypropyltrimethoxysilane, γ-(methacryloxy-propyl)trimethoxysilane, γ(2-aminoethyl)aminopropyl-trimethoxysilane, γ-chloropropyltrimethoxysilane and γ-aminopropyltrimethoxysilane.

The silicon compounds represented by the above formulas (1)–(7) may be used singly or in combination of two or more types.

Among these silicon compounds, the polysilane represented by the formula (1) is the most preferable. Preferable polysiloxane for use in the invention is linear polysiloxane. Peroxides are preferably used in combination with the polysiloxane as a reaction accelerator mentioned below.

The treatment of the present invention may be used in combination with reaction accelerators to promote a fusion-joining reaction between pipes and a joint. The treatment may contain at least one of the following reaction accelerators: benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenyl acetate, tert-butyl perisobutylate, tert-butylper-tert-octoate, tert-butyl perpivalate, cumyl perpivalate, tert-butyl perdiethyl acetate and like peroxides and peresters; azobis-isobutyronitrile, dimethyl azoisobutyrate and like azo compounds which form free-radicals with the application of heat; acetic acid, p-toluenesulfonic acid, hydrochloric acid and like acids; and pyridine, triethylamine and like bases. Preferred compounds which forms free-radicals are dicumyl peroxide, di-tert-butyl peroxide, 2,5-dimethyl-2,5-di(peroxybenzoate) hexyne-3, 2,5-dimethyl-2,5-di(tert-butylperoxy)hexane, 1,4-bis(tert-butylperoxyiso-propyl)benzene and like dialkyl peroxides.

The method of the present invention comprises the steps of preparing a treatment by adding a solvent to the above-specified silicon compound or the silicon compound and the reaction accelerator, applying the treatment to the outer surfaces of polyolefin pipes and/or the inner surface of a polyolefin joint, inserting the pipes into the joint, and heating the pipes and joint in a conventional manner. The treatment can be applied to the pipes and joint in conventional manners known in the art. For example, (a) the treatment is applied to the outer surfaces of the polyolefin pipes and/or the inner surface of the polyolefin joint by means of tissue paper or a paper sheet: (b) the treatment is brushed onto the outer surfaces of the polyolefin pipes and/or the inner surface of the polyolefin joint; or (c) the treatment is sprayed onto the outer surfaces of the polyolefin pipes and/or the inner surface of the polyolefin joint. Optionally, the outer surfaces of the pipes and/or the outer surface of the joint may be pretreated with ultraviolet radiation after applying the treatment. Useful solvents are those which have been conventionally used for wiping the surfaces of the pipes. For example, toluene, xylene, benzene, ethanol, methanol, isopropanol, n-propanol, butanol, tetrahydrofuran, dimethoxyethane, dimethylacetamide, ethylene glycol, triethylene glycol and tetra-ethylene glycol are preferably used.

The proportion of silicon compounds relative to the solvent is not particularly limited. It is typically about 0.1–100 wt. parts, preferably about 1–40 wt. parts based on 100 wt. parts of the solvent. When a reaction accelerator is used, the amount is not greater than its solubility limit in the solvent based on 10 wt. parts of the silicon compound, preferably not greater than 10 wt. parts, more preferably not greater than 4 wt. parts.

The amount of the silicon compound applied to the joining surfaces of the pipes and joint is not limited. The amount is typically about 0.001–100 $g/m^2$, preferably about 0.01–50 $g/m^2$. The amount of the reaction accelerator is not particularly limited and typically about 0.1–100 wt. % based on the silicon compound, preferably about 0.5–40 wt. %. The conditions for heating the joining portion are not particularly limited. Typically, the heating temperature is about 200±20° C. and the heating period is about 10–30 seconds, which are employed in normal heat-fusion between polyolefin pipes and EF joint.

In the present invention, polyolefin pipes may be preliminarily planed and/or wiped with alcohols as in conventional techniques. With this pretreatment, the joining characteristics between the pipes and joint are improved.

It goes without saying that the treatment of the present invention is useful for joining not only polyolefin pipes but also other polyolefin products in different configurations.

Presumably, the joining characteristics between the polyolefin pipes and joint are remarkably improved in the present invention for the following reason:

Since a silicon compound having Si-Si bond and/or Si-H forms silyl radicals with the application of heat or in the presence of a free-radical initiator, it is likely to react with the surfaces of sand particles, polyolefin pipes and oxide layers of the polyolefin pipes and form chemical bonds.

In addition, a silicon compound having Si-X (X is at least one of hydroxyl group, alkoxyl group, halogen atom, amino group or amide group) is likely to react with Si-OH on the surfaces of the sand particles and form chemical bonds.

Further, a silicon compound having Si-O bond have an affinity for Si-OH and Si-O on the surfaces of the sand particles.

On the other hand, a silicon compound having Si-R (R is an alkyl, alkenyl, aryl and like hydrocarbon groups) has an affinity for the polyolefin pipes.

Consequently, when polyolefin pipes and polyolefin joint are connected according to the present invention, even if sand particles are deposited on the surfaces of the polyolefin pipes, the sand particles themselves are chemically incorporated into the joining portion. Therefore, the presence of the sand particles does not greatly degrade the strength of the joining portion.

EFFECT OF THE INVENTION

The present invention can significantly improve the joining properties of polyolefin pipes by means of a polyolefin joint even under the disadvantageous working conditions of an installation field.

In addition, the silicon compound for use in the present invention can be applied to the joint and pipes in conventional manners as in wiping with acetone and alcohols. Therefore, conventional working process does not have to be changed.

Further, the treatment of the present invention is useful for joining polyolefin materials in other shapes than a pipe.

PREFERRED EMBODIMENT

The following Examples and Comparative Examples are provided to illustrate the present invention in further details.

Method for joining and test of joining strength

In the Examples and Comparative Examples below, according to conventional methods, polyethylene pipes were pretreated by the following conventional method: The outer surfaces of the polyethylene pipes (60.2 mm in outer diameter, 5.5 mm in thickness) were or were not scraped in 0.2 mm depth immediately after being taken out from packaging materials or after being taken out from the packaging materials and left outdoors. The pipes were wiped with an alcohol. Then a specific amount of sand (particle diameter: 106 μm or smaller) was deposited on the outer surfaces of the pretreated polyethylene pipes.

Subsequently, a treatment prepared by adding methylphenylpolysilane having an average degree of polymerization of 6 to a specific solvent was applied onto the surfaces of the pretreated polyethylene pipes using a sprayer. Then, the pipes were inserted into a polyethylene EF joint (60.5 mm in inner diameter, 7.1 mm in thickness). An electrical current was applied to the joint at an average clearance of 0.5 mm for 110 seconds to connect the pipes and joint. The power of the electrical current applied thereto was about $4W/cm^2$, and the joining portion was maintained at about 200° C. or above for about 20 seconds.

Thereafter, eight 10 mm-wide test pieces were cut out from the joining portion at specific intervals in the longitudinal direction of the pipes. A handle was welded to the end of the EF joint as shown in FIG. 3 to carry out a peel test. The joining portion was 31 mm in length (as long as the width of the heat-applied zone of the EF joint). The conditions for conducting the peel test were a temperature of 23° C. and a stretching rate of 50 mm/sec. The results obtained in Examples and Comparative Examples are shown in Table 1.

EXAMPLES 1–3

A 10 wt. % solution of methylphenylpolysilane in toluene was prepared. The solution was applied to the scraped surfaces of polyethylene pipes, on which sand particles were deposited. The pipes were subjected to a welding operation successively. Using test pieces obtained from the joining portion of the pipes and joint, a peel test was carried out.

Comparative Example 1 described below corresponds to the standard fusion welding which is currently in use.

As seen from the results in Table 1, the test pieces Examples 1–3 shows much higher load bearing capacity and remaining length than those of Comparative Example 1.

Thus, it is revealed that the use of the silicon compound of the present invention can significantly improve the properties of the joining portion of polyethylene pipes even when sand particles are deposited thereon.

EXAMPLE 4

A welding operation and peel test were carried out following the procedure of Examples 1–3 with the exception of using a solution of 10 wt. % of methylphenyl-polysilane and 1 wt. % of benzoyl peroxide in toluene.

As well as in Examples 1–3, the properties of the joining portion of the polyethylene pipes were improved.

EXAMPLE 5

A welding operation and peel test were carried out following the procedure of Examples 1–3 with the exception of using polyethylene pipes which had not been scraped.

Even when oxides and deposits are present on the surfaces of the polyethylene pipes, the use of the silicon compound can significantly improve the properties of the joining portion of the polyethylene pipes.

EXAMPLES 6–10

Welding operations and peel tests were carried out following the procedure of Examples 1–3 with the exception of using solutions of 25 wt. % of methylphenyl-polysilane in toluene.

Although the properties of the joining portion decreased as the amount of sand deposited on the surfaces of the polyethylene pipes increased, the values of the test results remained at sufficient levels for a practical use.

EXAMPLES 11–24

Welding operations and peel tests were carried out following the procedure of Examples 1–3 with the exception of using solutions (containing 25 wt. % of methylphenylpolysilane) having different compositions of acetone/ethanol as solvents.

Regardless of the acetone/ethanol compositions, the properties of the joining portions of the polyethylene pipes were improved as well as in Examples 1–3.

EXAMPLES 25–26

Welding operations and peel test were carried out following the procedure of Examples 1–3 with the exception of using a solution of 10 wt. % of methylphenylpolysilane and 0.2 wt. % of di-tert-butyl peroxide in toluene.

As well as in Examples 1–3, the properties of the joining portions of the polyethylene pipes were improved.

EXAMPLES 27–28

Welding operations and peel test were carried out following the procedure of Examples 1–3 with the exception of using a solution of 10 wt. % of methylphenylpolysilane and 4 wt. % of di-tert-butyl peroxide in toluene.

As well as in Examples 1–3, the properties of the joining portions of the polyethylene pipes were improved.

EXAMPLE 29

A welding operation and peel test was carried out following the procedure of Example 5 using polyethylene pipes which were not subjected to a scraping treatment except that a 25 wt. % solution of methylphenyl-polysilane in toluene was used.

The result reveals that even when oxides and deposits are present on the surfaces of the polyethylene pipes, the use of a silicon compound can significantly improve the properties of the joining portion of the polyethylene pipes.

EXAMPLE 30

A welding operation and peel test were carried out following the procedure of Examples 1–3 with the exception of using a 25 wt. % solution of 1,1,3,3,5,5-heptamethyltrisiloxane in toluene.

As well as in Examples 1–3, the properties of the joint portion of the polyethylene pipes were improved.

EXAMPLE 31

A welding operation and peel test were carried out following the procedure of Examples 1–3 with the exception of using a solution of 25 wt. % of 1,1,3,3,5,5-heptamethyltrisiloxane and 2 wt. % of di-tert-butyl peroxide in toluene.

As well as in Examples 1–3, the properties of the joining portion of the polyethylene pipes were improved.

EXAMPLE 32

A welding operation and peel test were carried out following the procedure of Examples 1–3 with the exception of using a 25 wt. % solution of 1,3,5,7-tetramethylcyclotetrasiloxane in toluene.

As well as in Examples 1–3, the properties of the joining portion of the polyethylene pipes were improved.

EXAMPLE 33

A welding operation and peel test were carried out following the procedure of Examples 1–3 with the exception of using a solution of 25 wt. % of 1,3,5,7-tetramethylcyclotetrasiloxane and 2 wt. % of di-tert-butyl peroxide in toluene.

As well as in Examples 1–3, the properties of the joining portion of the polyethylene pipes were improved.

COMPARATIVE EXAMPLE 1

Following the procedure of Examples 1–3 with the exception that the amount of the sand deposits was 0.03 mg/cm$^2$ and methylphenylpolysilane was not used, polyethylene pipes and an EF joint were joined, test pieces were cut out from the joining portion and a peel test was carried out.

This joining operation nearly corresponds to a standard fusion welding which is currently in use. However, it was revealed that the joining portion of this Comparative Example could be easily broken when a load of over 35 kg was applied thereto.

COMPARATIVE EXAMPLES 2–3

Following the procedure of Comparative Example 1 with the exception that the amount of sand deposits were increased, polyethylene pipes and EF joint were welded, test pieces were cut out and a peel test was carried out.

The results revealed that when a large amount of sand was deposited to the joining portion, these joining portions could be easily broken with a relatively light load.

TABLE 1

| Example | Silicon compound | Solvent | Sand deposit (mg/cm$^2$) | Load (kg) | Remaining length (mm) | Remarks |
|---|---|---|---|---|---|---|
| 1 | 10% polysilane | Toluene | 0 | 68.39 | 31 | |
| 2 | 10% polysilane | Toluene | 0.0314 | 64.99 | 31 | |
| 3 | 10% polysilane | Toluene | 0.0548 | 65.33 | 31 | |
| 4 | 10% polysilane | Toluene | 0.0314 | 67.41 | 31 | Containing 1% of BOP |
| 5 | 10% polysilane | Toluene | 0.0365 | 61.90 | 31 | No scraping |
| 6 | 25% polysilane | Toluene | 0.0336 | 70.21 | 31 | |
| 7 | 25% polysilane | Toluene | 0.0484 | 69.43 | 31 | |
| 8 | 25% polysilane | Toluene | 0.0564 | 64.37 | 20 | |
| 9 | 25% polysilane | Toluene | 0.0710 | 52.44 | 12 | |
| 10 | 25% polysilane | Toluene | 0.1763 | 48.55 | 16 | |
| 11 | 25% polysilane | 10/0 | 0.034 | 69.04 | 31 | Solvent: ratio of acetone/ethanol |
| 12 | 25% polysilane | 10/0 | 0.055 | 66.80 | 31 | Solvent: ratio of acetone/ethanol |
| 13 | 25% polysilane | 5/5 | 0.0344 | 64.94 | 31 | Solvent: ratio of acetone/ethanol |
| 14 | 25% polysilane | 5/5 | 0.0516 | 66.76 | 31 | Solvent: ratio of acetone/ethanol |
| 15 | 25% polysilane | 4/6 | 0.0326 | 66.99 | 31 | Solvent: ratio of acetone/ethanol |
| 16 | 25% polysilane | 4/6 | 0.0558 | 67.11 | 31 | Solvent: ratio of acetone/ethanol |
| 17 | 25% polysilane | 3/7 | 0.0321 | 69.64 | 31 | Solvent: ratio of acetone/ethanol |
| 18 | 25% polysilane | 3/7 | 0.0536 | 67.87 | 31 | Solvent: ratio of acetone/ethanol |
| 19 | 25% polysilane | 2/8 | 0.0337 | 71.67 | 31 | Solvent: ratio of acetone/ethanol |
| 20 | 25% polysilane | 2/8 | 0.0537 | 68.86 | 31 | Solvent: ratio of acetone/ethanol |
| 21 | 25% polysilane | 1/9 | 0.0311 | 67.75 | 31 | Solvent: ratio of acetone/ethanol |
| 22 | 25% polysilane | 1/9 | 0.0539 | 67.78 | 31 | Solvent: ratio of acetone/ethanol |
| 23 | 25% polysilane | 0/10 | 0.0338 | 70.35 | 31 | Solvent: ratio of acetone/ethanol |
| 24 | 25% polysilane | 0/10 | 0.0540 | 69.29 | 31 | Solvent: ratio of acetone/ethanol |
| 25 | 25% polysilane | Toluene | 0.0354 | 66.49 | 31 | *1 |
| 26 | 25% polysilane | Toluene | 0.0525 | 70.28 | 31 | *1 |
| 27 | 25% polysilane | Toluene | 0.0305 | 63.69 | 31 | *2 |
| 28 | 25% polysilane | Toluene | 0.0506 | 66.54 | 31 | *2 |
| 29 | 25% polysilane | Toluene | 0.0313 | 67.52 | 31 | No scraping |
| 30 | 25% polysiloxane A | Toluene | 0.0301 | 67.36 | 31 | *3 |
| 31 | 25% polysiloxane A | Toluene | 0.0332 | 67.01 | 31 | *4 |
| 32 | 25% polysiloxane B | Toluene | 0.0317 | 69.66 | 31 | *5 |
| 33 | 25% polysiloxane B | Toluene | 0.0329 | 68.11 | 31 | *6 |

TABLE 1-continued

| | Silicon compound | Solvent | Sand deposit (mg/cm$^2$) | Load (kg) | Remaining length (mm) | Remarks |
|---|---|---|---|---|---|---|
| Comparative Example | | | | | | |
| 1 | — | — | 0.03 | 35.57 | 0 | |
| 2 | — | — | 0.1916 | 8.22 | 0 | |
| 3 | — | — | 0.2816 | 6.88 | 0 | |

*1: Containing 0.2 wt. % of di-tert-butyl peroxide
*2: Containing 4 wt. % of di-tert-butyl peroxide
*3: Polysiloxane A = 1,1,3,3,5,5-heptamethyltrisiloxane
*4: Polysiloxane A with 2 wt. % of di-tert-butyl peroxide added
*5: Polysiloxane B = 1,3,5,7-tetramethylcyclotetrasiloxane
*6: Polysiloxane B with 2 wt. % of di-tert-butyl peroxide added
*7: Remaining length = width of the zone in which the electric heating wire is embedded inside the joint ($L_1$) - length of the fusion-joined surface which was brittlely peeled off.

EXAMPLE 34

As pretreatments, polyethylene pipes were taken out from packaging materials, left outdoors for 3 weeks, scraped off on the outer surfaces in 0.2 mm depth and wiped with alcohol.

Following the procedure of Examples 1–3 with the exception of using the pretreated polyethylene pipes, methylphenylpolysilane was applied to the polyethylene pipes to carry out joining between the pipes and the EF joint and a peel test of test pieces.

The results are shown in Table 2 along with those of Examples 35–36 and Comparative Examples 4–6.

COMPARATIVE EXAMPLE 4

Following the procedure of Example 34 with the exception that methylphenylpolysilane was not used, polyethylene pipes and EF joint were joined and test pieces were cut off from the joining portion to carry out a peel test.

EXAMPLE 35

As a pretreatment, the outer surfaces of polyethylene pipes left outdoors for 3 weeks were wiped with alcohol without being scraped. Subsequently, following the procedure of Examples 1–3, methylphenylpolysilane having an average degree of polymerization of 6 was applied to the surfaces of the pipes which were then connected to an EF joint. Test pieces were prepared from the joining portion, and a peel test was carried out with the pieces.

COMPARATIVE EXAMPLE 5

Following the procedure of Example 35 with the exception that methylphenylpolysilane was not used, polyethylene pipes and an EF joint were joined, test pieces were cut out, and a peel test was carried out.

EXAMPLE 36

Following the procedure of Examples 1–3 with the exception of using polyethylene pipes left outdoors for 3 weeks without any pretreatments, methylphenylpolysilane having an average degree of polymerization of 6 was applied to the outer surfaces of the pipes, the pipes and EF joint were joined, test pieces were prepared from the joining portion, and a peel test was carried out.

COMPARATIVE EXAMPLE 6

Following the procedure of Example 36 with the exception that methylphenylpolysilane was not used, polyethylene pipes and an EF joint were joined, test pieces were cut out and a peel test was carried out.

TABLE 2

| | Peel test | |
|---|---|---|
| | Load (kgf) | Remaining length (mm) |
| Example 34 | 75.2 | 31 |
| Example 35 | 68.0 | 26 |
| Example 36 | 58.5 | 19 |
| Comparative Example 4 | 78.1 | 31 |
| Comparative Example 5 | 5.3 | 6 |
| Comparative Example 6 | 6.5 | 0 |

The results shown in Table 2 reveal that the method of the present invention is very effective for joining polyethylene pipes having the surfaces covered by oxide layers formed by being left outdoors for a long period of time. The effectiveness is especially ascertained by the good fusion-joining results of Example 36, wherein no pretreatments such as scraping or alcohol wiping were conducted.

We claim:

1. A method for joining polyolefin pipes by means of a polyolefin joint, the method comprising the steps of placing a treatment composition containing a silicon compound or a treatment composition containing a silicon compound and a reaction accelerator between the pipes and the joint and heating a joining portion, wherein the silicon compound is at least one member selected from the group consisting of linear polysilane and cyclic polysilane represented by the formula (1)

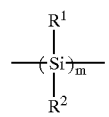

(1)

wherein $R^1$ and $R^2$ are the same or different and each is selected from the group consisting of a hydrogen atom, halogen atom, hydroxyl group, $C_1$–$C_{20}$ alkyl group, alkenyl group, aryl group, alkoxyl group, amino group, amide group and silyl group; m is about 2–10000.

2. A treatment composition for joining polyolefin, the treatment composition comprising a solvent containing a silicon compound or a solvent containing a silicon compound and a reaction accelerator, wherein the silicon compound is at least one member selected from the group consisting of linear polysilane and cyclic polysilane represented by the formula (1)
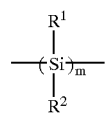 (1)
wherein $R^1$ and $R^2$ are the same or different and each is selected from the group consisting of a hydrogen atom, halogen atom, hydroxyl group, $C_1$–$C_{20}$ alkyl group, alkenyl group, aryl group, alkoxyl group, amino group, amide group and silyl group; m is about 2–10000.
* * * * *

UNITED STATES PATENT AND TRADEMARK OFFICE
CERTIFICATE OF CORRECTION

PATENT NO. : 6,436,224 B1
DATED : August 20, 2002
INVENTOR(S) : Nishimura et al.

It is certified that error appears in the above-identified patent and that said Letters Patent is hereby corrected as shown below:

Column 1,
Line 17, "have" should read -- has --
Line 46, "is" should read -- are --

Column 2,
Line 36, "a" should read -- an --

Column 3,
Line 34, "2343–44" should read -- 2342–44 --
Line 35, "1991" should read -- 1990 --

Column 5,
Line 31, "forms" should read -- form --

Column 6,
Line 33, "have" should read -- has --

Signed and Sealed this

Eleventh Day of February, 2003

JAMES E. ROGAN
*Director of the United States Patent and Trademark Office*